April 3, 1934.  F. A. GARBUTT  1,953,295
CHEWING GUM MIXING METHOD
Filed May 31, 1932  2 Sheets-Sheet 1
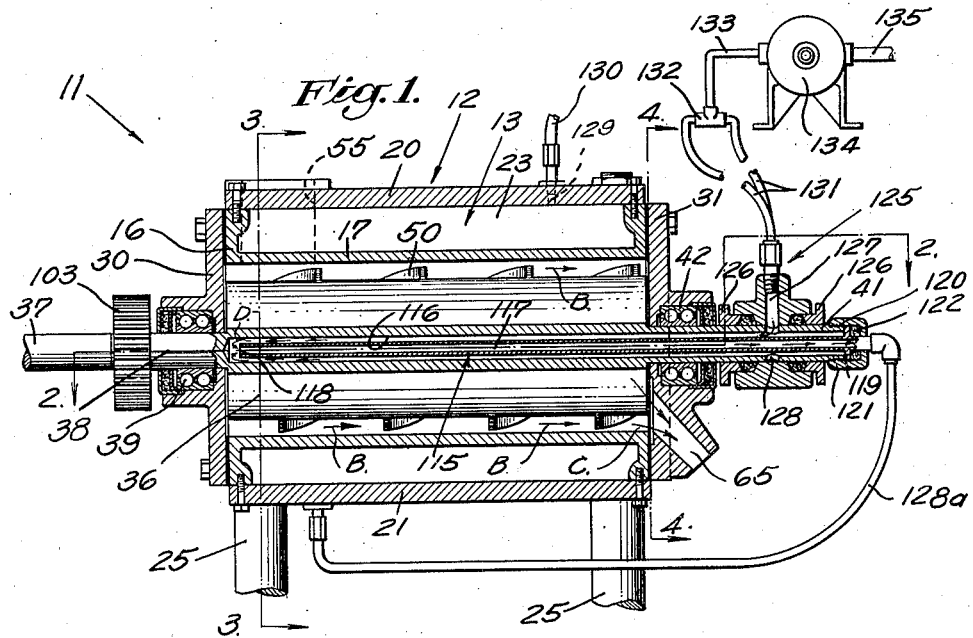
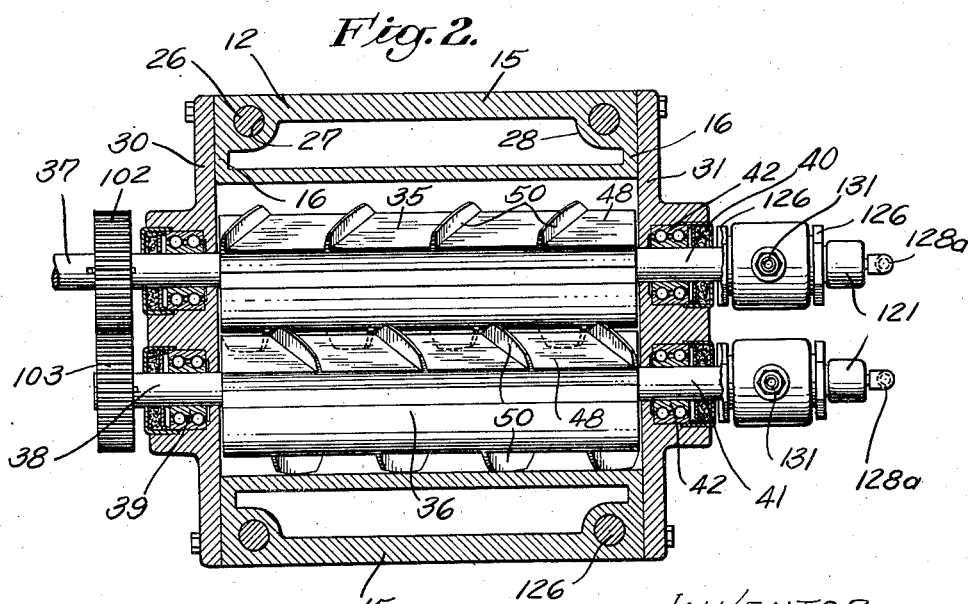
INVENTOR
FRANK A. GARBUTT,
By
Fred W. Lamir
ATTORNEY.

INVENTOR:
FRANK A. GARBUTT,

ATTORNEY.

Patented Apr. 3, 1934

1,953,295

UNITED STATES PATENT OFFICE 1,953,295

CHEWING GUM MIXING METHOD

Frank A. Garbutt, Los Angeles, Calif.

Application May 31, 1932, Serial No. 614,343

5 Claims. (Cl. 99—11)

My invention relates to the manufacture of chewing gum.

It is an object of my invention to provide a method of mechanically treating the ingredients of such gum for the purpose of producing a homogeneous mixture of such ingredients which will have certain superior mechanical characteristics.

It is a further object of my invention to provide a novel apparatus by which the ingredients of the gum may be worked in accordance with said novel method.

The apparatus disclosed herein is disclosed in my Patent No. 1,852,005, patented April 5, 1932, on application Serial No. 520,101, filed March 4, 1931, for Method of forming chewing gum.

This apparatus may be used for other purposes than treating the ingredients of chewing gum but has a special utility when so used and will be hereinafter described as it is used in said treatment.

In the manufacture of chewing gum the gum material is usually heated in kettles until it is soft and plastic. The gum is then delivered to an apparatus for mixing and kneading, and then is delivered in a plastic state to an apparatus for forming the gum material into sheets or strips in preparation for cutting into individual sticks. As the gum material is removed from the kettles it cools rapidly and it has been found difficult to maintain the temperature long enough to secure the mechanical working which has been found necessary to produce the smooth consistency and other desirable chewing characteristics of the gum.

As the gum material is removed from the kettles according to present practice it is usually too soft to secure the proper subsequent mechanical working. However, the gum chills so rapidly that in most of the prior art devices known to me, the mechanical mixing and kneading must be carried out immediately, so that the gum will not entirely lose its plastic state before it is finally formed into sheets or strips, which operation is usually accomplished by rolling devices.

It is important to complete the mixing and kneading operation before the gum material has cooled to such an extent that the ingredients thereof cannot be mixed into the necessary finely interlacing structure. If the gum is allowed to become chilled so that thorough mixing and kneading is not accomplished, air pockets are allowed to remain in the mass which produce unpleasant decomposition products when the gum is kept for long periods. Such pockets also affect the appearance and saleability of the gum.

With the above discussed disadvantages in view, my invention has for one of its objects the provision of a machine for manufacturing chewing gum which includes means for maintaining the gum at a suitable predetermined temperature during the successive operations of mixing and kneading.

It is another object of my invention to provide a chewing gum machine including a mixing chamber into which the ingredients of a chewing gum may be introduced, and mixing apparatus in the chamber adapted to mix and knead the gum into final chewable texture before expelling the gum from the chamber.

Further objects and advantages will be made evident hereinafter.

An apparatus which I have found well suited to the practice of my invention is illustrated in the following drawings, in which:

Fig. 1 is a vertical sectional view taken on a median plane through the chewing gum mixing machine embodying the features of my invention.

Fig. 2 is a horizontal section through the mixing chamber of the machine, this view being taken on a plane represented by the line 2—2 of Fig. 1.

Figure 3:
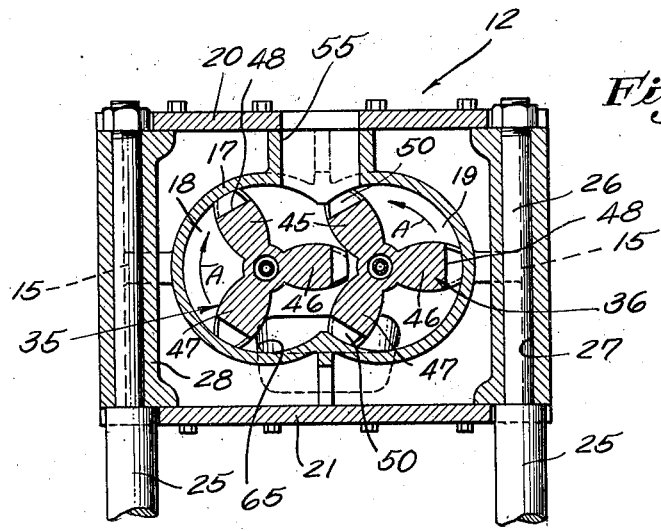
Fig. 3 is a section on a plane represented by a line 3—3 in Fig. 1.

Referring to the drawings, I show my chewing gum mixing machine generally designated by the numeral 11, which includes a body 12 comprising a double walled mixing chamber 13. The mixing chamber comprises a casing, of double walled construction, providing outer side walls 15, end walls 16, and inner walls 17. These inner walls extend longitudinally of the body 12 between the end walls 16, and form complemental circular channels 18 and 19 opening through the end walls 16 and being in open communication with each other. Upper and lower cover plates 20 and 21, respectively, are provided as shown to complete a fluid circulating space 23, substantially encircling the channels 18 and 19. The body 12 is supported on legs 25 which have upper reduced diameter portions 26 extending through vertical holes 27 provided in enlarged portions 28, formed in the walls 15, the legs 25 being secured in the manner shown. The forward ends of the channels 18 and 19 are closed by an end cover plate 30 secured to the forward end wall 16, and the rearward ends of these channels are closed by an end cover plate 31, which plate is secured to the rearward end wall 16 of the chamber 13 by bolts, in the manner shown.

Positioned within the channels 18 and 19 are a pair of cooperating mixing and kneading elements 35 and 36, respectively, provided with integral shaft 37 and 38 which extend forwardly through suitable bearings 39 supported in the forward cover plate 30. The elements 35 and 36 are also respectively provided with integral shafts 40 and 41 which extend rearwardly through, and are journaled by, suitable bearings 42 supported in the rearward cover plate 31, in the manner shown.

The mixing elements 35 and 36 are somewhat propeller-like in cross-section, as shown in Fig. 3, each having a plurality of radial vanes 45, 46, and 47 which extend longitudinally and terminate just short of the forward and rearward end walls 16. The vanes of each element alternately project into the depression or space between two of the vanes of the adjacent element for a part of a revolution, in a loosely meshing fashion, but do not actually contact, as will be seen by inspecting Fig. 3.

Formed on the outer faces 48 of each of the elements 35 and 36 are a series of propelling blades 50. The blades 50 are disposed diagonally relative to the longitudinal axis of the elements 35 and 36, the outer surfaces thereof being of such a configuration as to be contiguous to the inner surfaces of the channels 18 and 19. The blades 50 of the mixing element 35 are reversely arranged and staggered relative to the blades 50 of the element 36 in such a manner as to cooperate to propel a plastic material, such as gum, axially in the channels 18 and 19, in a rearward direction, the material being introduced into the forward end of the chamber 13 through an inlet opening 55.

Although I have shown and specifically described the mixing and kneading elements as having three radial vanes, it should be apparent that the number and arrangement of these vanes is more or less immaterial and that the breadth of my invention should not be limited to such details of construction.

Figure 4:
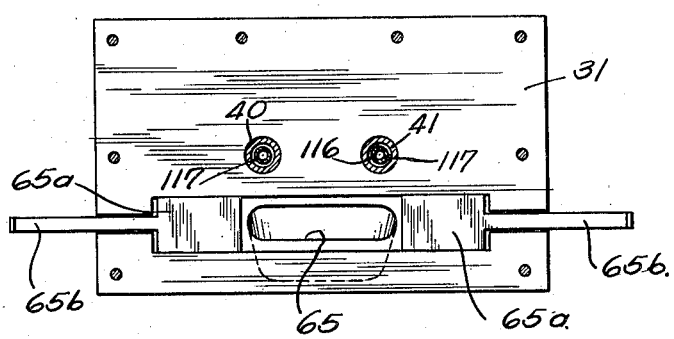
Fig. 4 is a section on a plane represented by the line 4—4 of Fig. 1.

Formed in the end cover plate 31 is an outlet passage 65. Slidably positioned in a laterally extending recess formed in the inner face of the end cover plate 31 adjacent the passage 65 is a pair of gate members 65a. These members are adapted to cooperate to close the passage 65 when both gate members are in their innermost positions and to allow the passage of gum through the passage 65 when in their outermost or retracted positions, as shown in Fig. 4. Each of the gate members 65a is provided with a handle 65b which projects outwardly from the body 12 and serves as a manual grasping means for operating the gate members.

The shafts 37 and 38 are provided with gears 102 and 103 which are keyed thereon and hold the mixing elements 35 and 36 in proper angular relationship with each other, one of these shafts being driven by a suitable prime mover not shown.

As has been previously explained, it is desirable, when handling a plastic material such as chewing gum, to maintain the material at a suitable temperature. The preferred form of my invention, therefore, includes an individual heating means associated with each of the mixing elements 35 and 36, the details of which I will now describe. Since the parts of the individual heating means and the arrangement thereof with the respective mixing elements and pump screws are identical, I will describe only one, such as the heating means 115 cooperating with the mixing element 36, and I will characterize the identical parts of each with the same numerals.

Referring in particular to Fig. 1, the mixing element 36 is provided with an axial bore 116 extending from the end of the rearwardly projecting shaft 41 to a point adjacent the forward end of the element 36. Positioned axially within the bore 116 is a tubular member 117 which is of smaller exterior diameter than the diameter of the bore 116 and which terminates at 118, just short of the forward end of the bore 116. Adjacent its rearward end the tubular member 117 is provided with a flange 119 adapted to abut against the rearward end 120 of the shaft 41. The flange 119 is confined in this position by a gland member 121 including packing means 122, the gland being threadedly connected to exterior threads provided on the rearward end 120 of the shaft 41, as shown, in such a manner as to permit the shaft 41 and the mixing element 36 to rotate while the tubular member 117 remains stationary.

Positioned on the rotatable shaft 41 between the gland member 121 and the bearing 42 is a stationary double gland 125 including a packing member 126 in each end thereof and being provided with an intermediate fluid inlet opening 127 adapted to register alternately with a series of lateral ports 128 formed in the shaft 41 and communicating with the bore 116.

Threadedly connected to the rearward ends of those tubular members 117 associated with the mixing elements 35 and 36 is a pair of pipes 128a which lead to the forward end of the mixing chamber 13, as shown, and which place the tubes 117 in communication with the fluid circulating space 23 surrounding the channels 18 and 19. Provided at a remote point in the chamber 13 is an outlet opening 129 from which a return pipe 130 leads to a source of supply, not shown. As diagrammatically shown in Fig. 1, a pair of pipes 131 is connected by threaded nipples and couplings to the inlet openings 127 of each of these double glands 125 that are associated with the mixing elements. The pipes 131 are likewise connected by a T-fitting 132 to the outlet pipe 133 of a fluid pump 134, which in turn is connected by a pipe 135 to a source of fluid supply not shown.

The operation of my invention is as follows: The constituents of a chewing gum, including the base, flavoring, sugar, etc., are introduced into the mixing chamber 13 through the inlet opening 55, either separately as a mass, by any suitable means. The mixing elements 35 and 36 are suitably driven by the gears 102 and 103 so as to rotate in clockwise and counter-clockwise directions, respectively, when viewed as in Fig. 3, as indicated by the arrows "A". The gum is thoroughly mixed and kneaded by the intermeshing action of the vanes 45, 46 and 47 while at the same time it is propelled rearwardly in the direction of the arrows "B" of Fig. 1, by the blades 50. When the gum reaches the rearward end of the channels 18 and 19 in a thoroughly mixed condition and of a final chewable texture, it is forced through the outlet passage 65, as indicated by the arrows "C" of Fig. 1. As the gum is being mixed and kneaded in the mixing chamber a fluid at a suitable temperature is constantly delivered by the pump 134 to the inlet openings 127 of the gland members 125 associated with the mixing elements, and is caused to flow forwardly through the bores 116 and to return rearwardly through the tubes 117, as indicated by the arrows "D" of Fig. 1. After circulating through the bores 116 and the tubes 117 the fluid is delivered to the space 23 through the pipes 128a and is caused to circulate around the channels 18 and 19 before being carried away by the return pipe 130. If desired, pumping means may be placed in the line 130 to assist the pump 134 in circulating the fluid. It will be seen that by this circulation of fluid within the mixing elements 35 and 36 and around the comparatively thin walled channels 18 and 19 confining the gum during the mixing thereof, it is possible to maintain the temperature of the gum at any desired temperature by varying the temperature of the fluid to suit conditions.

By my invention a chewing gum of proper chewing qualities may be produced from suitable ingredients. The term "proper chewing qualities" is hard to define, although these qualities themselves are readily recognized. To have proper chewing qualities the gum must not (a) Stick to the teeth at any time, (b) Be so hard as to make the act of chewing too difficult, (c) Be so soft that it does not offer substantial resistance to the teeth.

The gum must (d) Be uniform in texture, (e) Have a smooth outer surface during the entire time it is being chewed.

Whether a gum has proper chewing qualities or not can be readily tested by simultaneously and separately chewing the gum to be tested and any of the widely sold chicle type gums, such as Beeman's, Wrigley's, or Beechnut gum. The gum to be tested should have chewing qualities very similar to the best of these chicle type gums.

To make a gum of proper chewing qualities it is necessary to use suitable ingredients. By the term "suitable ingredients" I am to be understood as meaning ingredients such as those now used in the widely sold chicle type gums, or materials capable of producing gums of similar chewing qualities. In my apparatus the gum must be worked at "proper plasticity"; that is, at a plasticity about the same as that the widely sold chicle type gums assume after having been chewed for a short time.

The apparatus above described is the result of a long series of experiments extending over many years. In the course of these experiments I discovered that the chewing qualities of a gum depended considerably upon the methods by which it was compounded. I am of the opinion that chicle and other gums which, in their natural state, have desirable chewing qualities consist of a fibrous lacework probably of rubber or other elastic material in which is embedded other substances. I found further that if the gum ingredients were mixed in any ordinary mixer in which considerable tearing of the mixture takes place that the physical structure of the fibrous network was destroyed and the chewing quality of the gum was impaired. I then sought to devise a mixing device which would work largely by compaction and the apparatus above described was devised after many trials.

In this apparatus the gum ingredients are successively compacted between the vanes 45, 46 and 47 of the mixing elements 35 and 36 as they approach each other, the gum being squeezed together therebetween, thus constantly consolidating and compacting the mass of gum. As a result of this compaction or squeezing together with the constant shifting of the mass of gum due to the movement of the vanes 45, 46 and 47, I not only provide a thorough mixture of the different ingredients but I improve the mechanical structure of the mass. By introducing the gum ingredients at one end of and above the rolls and removing them from below at the other end of said rolls I provide a continuous processing machine which works very well with the other apparatus shown in my Patent No. 1,852,005 so that I am able to continuously mix the ingredients and to continuously produce a finely interlaced and homogeneous mixture.

In my various experiments with mixing machines for chewing gum I have not only found it necessary to supply heat to the gum material in the mixing chamber, but I have also found it necessary to maintain the entire mass of material in the mixing chamber at or very near a definite temperature. This is the temperature at which the gum has the proper plasticity. If too hot, the material tends to melt and flow as a liquid, which prevents the formation of the fibrous structure I have found so desirable. If too cold, the material tears and destroys the fibers. It is essential that all the gum be frequently contacted with the heated walls and that none of it remains in contact with these walls long enough to be overheated. The propelling blades 50 are therefore made of such size and shape that they fit closely against the inner walls of the cylindrical chambers in which they revolve, and they are so placed that every portion of said walls is scraped clean of material by said blades at least once in each revolution of the shafts 37 and 38. This scraping action constantly removes the material from contact with said inner walls and allows fresh material to come in contact therewith, thus uniformly heating the entire mass of material and preventing overheating of any part thereof.

The constant removal of material from the inner walls also prevents the material from accumulating thereon either as film or ridges, and preventing heat from being transmitted directly from the walls to the main body of the material. The propelling blades 50 therefore not only tend to force the material towards the outlet end of the mixing chamber, but also act as temperature equalizing means.

It is highly essential that the material be kept in constant motion and that there be no dead spaces or pockets in which the material can accumulate. It will be noted that the radial vanes 45, 46, and 47 are of such shape and the two elements 35 and 36 (of which these vanes are a part) are so geared together that they are self-cleaning and there are no spaces in which the material can lodge and remain. In the usual forms of mixing devices used in gum manufacturing, thin blades are used for mixing. The blades are not self-cleaning, with the result that the material tends to wrap itself therearound and to adhere to the backs of these blades, thus producing imperfect mixtures.

I claim as my invention:

1. A method of producing a chewing gum having proper chewing qualities which comprises: heating suitable ingredients until they attain a proper plasticity; and while at this plasticity subjecting the ingredients to successive compactions for a sufficient period to produce a mechanical structure having said qualities.

2. A method of producing the desired mechanical structure in a chewing gum compounded from suitable ingredients characterized by: subjecting a mixture of said ingredients (heated to a temperature producing in said mixture a moderate plasticity) to repeated and successive compactions.

3. A method of producing a chewing gum having suitable qualities which comprises: heating suitable ingredients until they attain a proper plasticity; and subjecting the plastic mass so produced to the action of members having surfaces which repeatedly approach and recede from each other and thus produce repeated compactions of said mass.

4. A method of producing a chewing gum having suitable qualities which comprises: heating suitable ingredients until they attain a proper plasticity; and subjecting the plastic mass so produced to repeated applications of additional heat and to the action of members having surfaces which repeatedly approach and recede from each other and thus produce repeated compactions of said mass.

5. A method of producing a chewing gum having suitable qualities which comprises: heating suitable ingredients until they attain a proper plasticity; and subjecting the plastic mass so produced to the action of members having surfaces which repeatedly approach and recede from each other at uniform speeds and thus produce repeated, uniform compactions of said mass.

FRANK A. GARBUTT.